US007984482B1

(12) United States Patent
Cannata et al.

(10) Patent No.: US 7,984,482 B1
(45) Date of Patent: *Jul. 19, 2011

(54) GLOBAL ACCOUNT LOCKOUT (GAL) AND EXPIRATION USING AN ORDERED MESSAGE SERVICE (OMS)

(75) Inventors: Philip Cannata, Austin, TX (US); Michael P. Dugan, Austin, TX (US); Andrew Coulbeck, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1262 days.

This patent is subject to a terminal disclaimer.

(21) Appl. No.: 11/303,640

(22) Filed: Dec. 16, 2005

(51) Int. Cl.
*G06F 17/30* (2006.01)
(52) U.S. Cl. ............... 726/2; 709/248; 713/168; 726/1; 726/3; 726/26
(58) Field of Classification Search ............... 726/2, 5; 713/375; 709/248
See application file for complete search history.

(56) References Cited

U.S. PATENT DOCUMENTS

| 6,539,381 | B1 * | 3/2003 | Prasad et al. ............ 707/10 |
| 6,708,170 | B1 * | 3/2004 | Byrne et al. ............ 707/9 |
| 7,251,732 | B2 * | 7/2007 | Jamieson et al. ............ 713/182 |
| 7,286,990 | B1 | 10/2007 | Edmonds et al. |
| 7,748,010 | B1 * | 6/2010 | Cannata et al. ............ 719/316 |
| 2002/0178138 | A1 * | 11/2002 | Ender et al. ............ 707/1 |
| 2003/0101359 | A1 * | 5/2003 | Aschen et al. ............ 713/201 |
| 2004/0117386 | A1 * | 6/2004 | Lavender et al. ............ 707/100 |
| 2005/0102370 | A1 | 5/2005 | Lin et al. |
| 2006/0130140 | A1 * | 6/2006 | Andreev et al. ............ 726/23 |
| 2006/0206768 | A1 * | 9/2006 | Varghese ............ 714/48 |
| 2006/0253340 | A1 * | 11/2006 | Levchin et al. ............ 705/26 |

OTHER PUBLICATIONS

Sun, Administration Guide Sun One Directory Server, Version 5.2, Jun. 2003, Sun Microsystems, Inc. pp. 1-442.
Office Action dated May 29, 2009 for U.S. Appl. No. 11/300,931.
Office Action dated Aug. 18, 2009 for U.S. Appl. No. 11/300,931.
Notice of Allowance dated Mar. 5, 2010 for U.S. Appl. No. 11/300,931.

* cited by examiner

*Primary Examiner* — Taghi T Arani
*Assistant Examiner* — Mohammad L Rahman
(74) *Attorney, Agent, or Firm* — Brooks Kushman P.C.

(57) ABSTRACT

A method, apparatus and computer program product for providing Global Account Lockout (GAL) using an Ordered Messaging Service (OMS) is presented. A database operation is received from a client, and a determination made regarding whether the operation contains an authentication mechanism. When the operation does not contain an authentication mechanism then the operation is returned from. When the operation does contain an authentication mechanism then the following steps are performed: locating the entry and checking its authentication mechanism, determining whether the authentication mechanism in the operation is good, sending a bind message to a GAL manager, checking and updating GAL state, committing updates to GAL state, and returning operation to the client.

6 Claims, 7 Drawing Sheets

GLOBAL ACCOUNT LOCKOUT (GAL) AND EXPIRATION USING AN ORDERED MESSAGE SERVICE (OMS)

BACKGROUND

Group Communication Systems (GCSs) are powerful building blocks that facilitate the development of fault-tolerant distributed systems. Classical GCS applications include replication using a variant of the state machine/active replication approach, primary-backup replication, support for distributed and clustered operating systems, distributed transactions and database replication, resource allocation, load balancing, system management and highly available servers. More recently, GCSs have been exploited for collaborative computing including distance learning, drawing on a shared white board, video and audio conferences and even distributed musical jam sessions over a network. Currently, real-time GCSs are being exploited for real-time applications, for example, radar tracking.

GCSs can be used to provide highly available services which are services that require maintaining a consistent shared state among numerous computers in order to guarantee high performance and availability. An example is using replicated databases. A number of instances of a database can exist in several different locations. They must all be kept synchronized in such a way that a client can query or update any of the databases and the results will be the same as if only a single copy of the database existed. A particular example is a Lightweight Directory Application Protocol (LDAP) compliant Data Server which is a high availability system used for keeping copies of data synchronized.

One aspect of such GCSs is security, and further the managing of security across multiple systems. For example, if a security policy is that any further login attempts are disregarded after three failed attempts, it is important that this applies across the GCS such that further login attempts (from a same or different machine) are still disregarded.

SUMMARY

Conventional mechanisms such as those explained above suffer from a variety of deficiencies. One problem in building distributed systems comes from the need to communicate and synchronize the different components of the system using networks that are prone to faults. In a distributed system (e.g. replicated databases or application server clusters) there are inherent uncertainties about the current state of remote components. Due to the complexity of such systems, the construction of a reliable and efficient distributed system is very difficult. GCS systems must maintain synchronization and timing between all the users of the system. This has proven difficult, especially when the use involves a global communication system with large number of remotely located users.

Embodiments of the invention significantly overcome such deficiencies and provide mechanisms and techniques that provide Global Account Lockout (GAL) using an Ordered Messaging Service (OMS). In a particular embodiment, the method includes receiving a database operation from a client, and determining if the operation contains an authentication mechanism. When the operation does not contain an authentication mechanism then the operation is returned from. When the operation does contain an authentication mechanism then the following steps are performed: locating the entry and checking its authentication mechanism, determining whether the authentication mechanism in the operation is good, sending a bind message to a GAL manager, checking and updating GAL state, committing updates to GAL state, and returning operation to the client.

A method of synchronizing directory servers performing GAL using OMS is also provided. In a particular embodiment, the method includes recording password changes in a change log and performing one of the group comprising a bind operation and a password change operation. The method further includes updating password changes in the Directory Server (DS) that had been disconnected.

Other embodiments include a computer readable medium having computer readable code thereon for providing GAL using OMS. The medium includes instructions for receiving a database operation from a client, and instructions for determining if the operation contains an authentication mechanism and when the operation does not contain an authentication mechanism then returning from the operation, and when the operation does contain an authentication mechanism then the following instructions are executed: instructions for locating the entry and checking its authentication mechanism, instructions for determining whether the authentication mechanism in the operation is good, instructions for sending a bind message to a GAL manager, instructions for checking and updating GAL state, instructions for committing updates to GAL state, and instructions for returning operation to the client.

Another embodiment includes a computer readable medium having computer readable code thereon for of synchronizing directory servers performing GAL using OMS. The medium includes instructions for recording password changes in a change log and instructions for performing one of the group comprising a bind operation and a password change operation. The medium further includes instructions for updating password changes in the Directory Server that had been disconnected.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides GAL using OMS and also synchronizing directory servers performing GAL using OMS as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing GAL using OMS and also synchronizing directory servers performing GAL using OMS as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A system providing Global Account Lockout (GAL) using an Ordered Messaging Service (OMS) includes a first client in communication with a first Directory Server (DS) and a second client in communication with a second DS. The first DS is also in communication with the second DS. A database operation is received at the first DS from the first client. A determination is made if the operation contains an authentication mechanism. The authentication mechanism may be realized as a password, Simple Authentication and Security Layer (SASL) or the like. SASL is a method for adding authentication support to connection-based protocols. To use SASL, a protocol includes a command for identifying and authenticating a user to a server.

When the operation does not contain an authentication mechanism, then a return from the operation is performed. When the operation does contain an authentication mechanism then the entry located and its authentication mechanism is checked. Next, a determination is made regarding whether the authentication mechanism in the operation is good. A bind message reflecting the determination is sent to a GAL manager. GAL state is then checked and updated, updates to GAL state are committed and operation is returned to the client.

The system also provides for synchronization between DSs when one of the DSs has left the group and then rejoins the group. In order to maintain consistency the DS rejoining the group needs to be synchronized with the other DSs. The method includes recording password changes in a change log. One of the group comprising a bind operation and a password change operation is performed. Password changes in the DS that had been disconnected are then updated.

Figure 1:
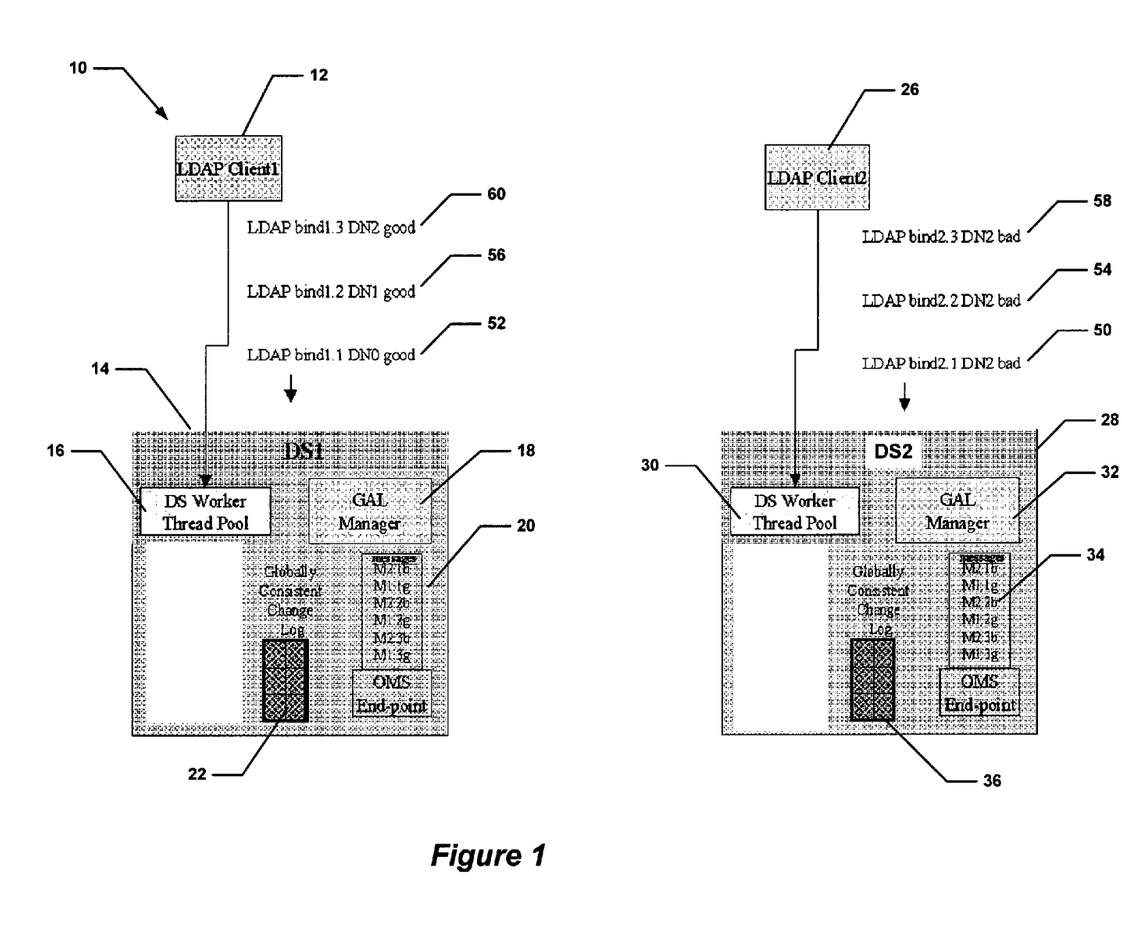
FIG. 1 comprises a block diagram of a particular embodiment for providing Global Account Lockout (GAL) using an Ordered Message Service (OMS)

Referring now to FIG. 1, a particular example of a system 10 for providing Global Account Lockout is shown. In this particular embodiment, GAL is provide as a plugin that will lock user accounts on all participating Directory Servers (DSs) after a predefined number of failed binds across all participating DSs has occurred. FIG. 1 shows how messages associated with LDAP Operations that contains a password are received by two DSs that each have the GAL plugin installed.

A first LDAP Client 12 submits an LDAP operation that contains a password to a DS 14 worker thread 16. A second LDAP Client 26 submits an LDAP operation that contains a password to a DS 28 worker thread 30. Messages arriving from multiple DSs are interleaved in the queues 20 and 34 in both DSs, however the messages appear in identical order in the both queues (this is part of the OMS).

The worker threads 16 and 30 check the password and if it's a valid password it sends a $bind_{good}$ message to the GAL group and goes into a wait state. Otherwise it sends a $bind_{bad}$ message to the GAL group and goes into a wait state. The messages from both worker threads are stored in an OMS end-point queue 20 in DS 14 and in end-point queue 34 of DS 28.

At some point in time the GAL manager 18 receives the bindq message where q is either "good" or "bad". If q is "good" and the account is locked, the operation's STATUS is set to "unsuccessful". Otherwise, the operation's STATUS is set to "successful", and all appropriate operational attributes in the backend database are appropriately updated, the change log is updated and a Fault Recovery Record is written. If q is "bad" the operation's STATUS is set to "unsuccessful", the failed login attempt is recorded in the appropriate operational attribute of the back-end database (which might mean the account is now locked), all other operational attributes are appropriately updated in the back-end database, the change log 22 is updated and a Fault Recovery Record is written. If the DS worker thread that sent the message is on the same machine as the GAL manager that received the message, the worker thread is awakened from its wait state with the STATUS of the LDAP operation. Otherwise the GAL manager returns to processing other GAL messages. The worker thread returns STATUS to the LDAP Client.

In this example, when operation 58, the LDAP bind 2.3 DN2 is processed, DN2 will be locked on all DSs, since this is the third attempt to bind, and all the attempts (operations 50 and 54 as well as 58) to bind DN2 have been returned as bad. This is assuming a security policy which only allows a maximum of three failed login attempts. DS 14 had proposed a successful bind in message 60, but since DN2 is now locked, DS 14 will now send back an unsuccessful bind.

Figure 2:
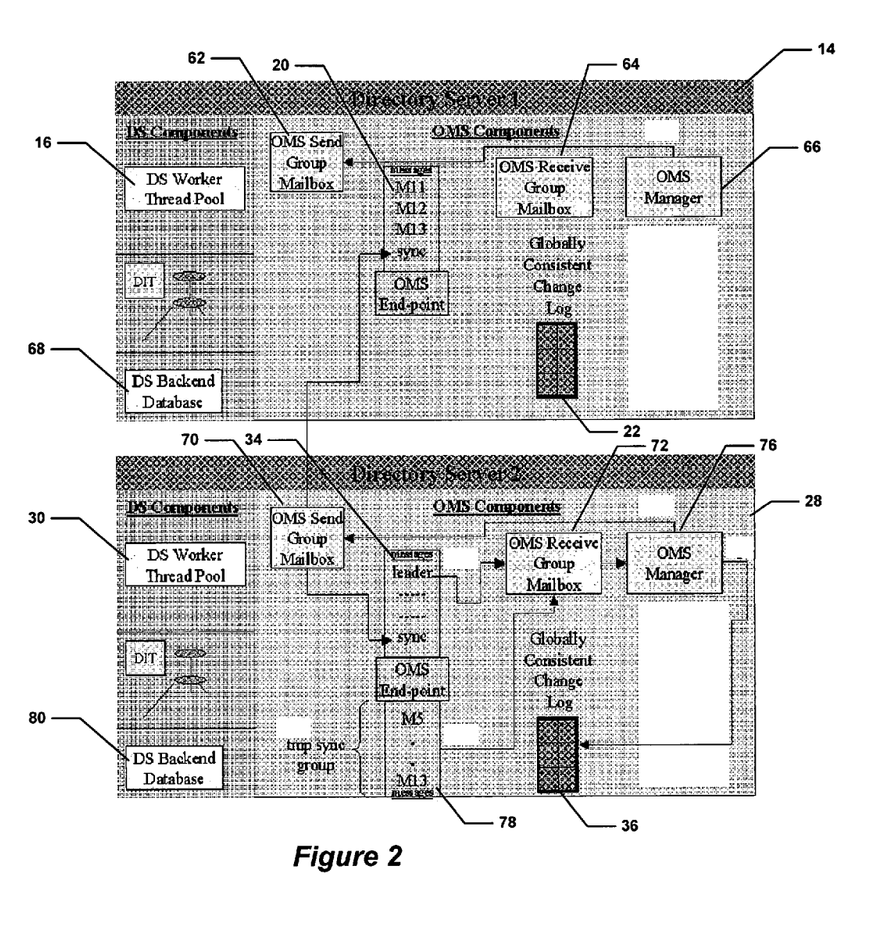
FIG. 2 comprises a block diagram of clients, directory servers and messages used in a particular embodiment for performing synchronization in a system providing GAL using OMS.

Referring now to FIG. 2, the synchronization process that is followed when a Directory Server loses communications with the main Directory Server group (i.e., the group that includes the elected leader) and then has the communications restored is shown. The environment includes a first Directory Server (DS) 14, the first DS 14 in communication with a second DS 28. Each DS 14 and 28 include a respective DS worker thread Pool 16 and 30, respective OMS Send Group Mailboxes 62 and 70 and respective OMS end-point queues 20 and 34. The end-point queues 20 and 34 store messages from all clients in the same order, as a function of the OMS. DS 14 and 28 further include respective OMS Receive Group Mailboxes 64 and 72 and respective OMS managers 66 and 76. The DSs 14 and 28 additionally include respective Globally Consistent Change Logs 22 and 6 and respective DS backend databases 68 and 80.

In operation, the OMS Manager 76 in the Directory Server 28 that had been disconnected receives a leader message from the OMS end-point queue 34 which means communications has been restored with the main DS group. The OMS Manager 76 creates a temporary group 78 through which synchronization with the Leader DS 14 in the main group will occur. The OMS Manager 76 sends a sync message to the OMS group via OMS Send group Mailbox 70 and then begins listening on the temporary group 78 for sync messages. The OMS Manager 66 of the elected Leader DS 14 receives the sync message and begins sending blocks of change log records as sync messages to the temporary group 78. The OMS Manager 76 in the syncing DS 28 receives the blocks of sync messages and uses them to bring its Change Log 36 back into global consistency. Once this is completed, the OMS Manager 76 in the syncing DS 28 discards all messages from the OMS group up to and including the sync message, deletes the temporary group 78 and then resumes normal operation as a part of the main group.

Flow charts of the presently disclosed methods are depicted in FIGS. 3A through 3C and FIGS. 4A through 4B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3A:
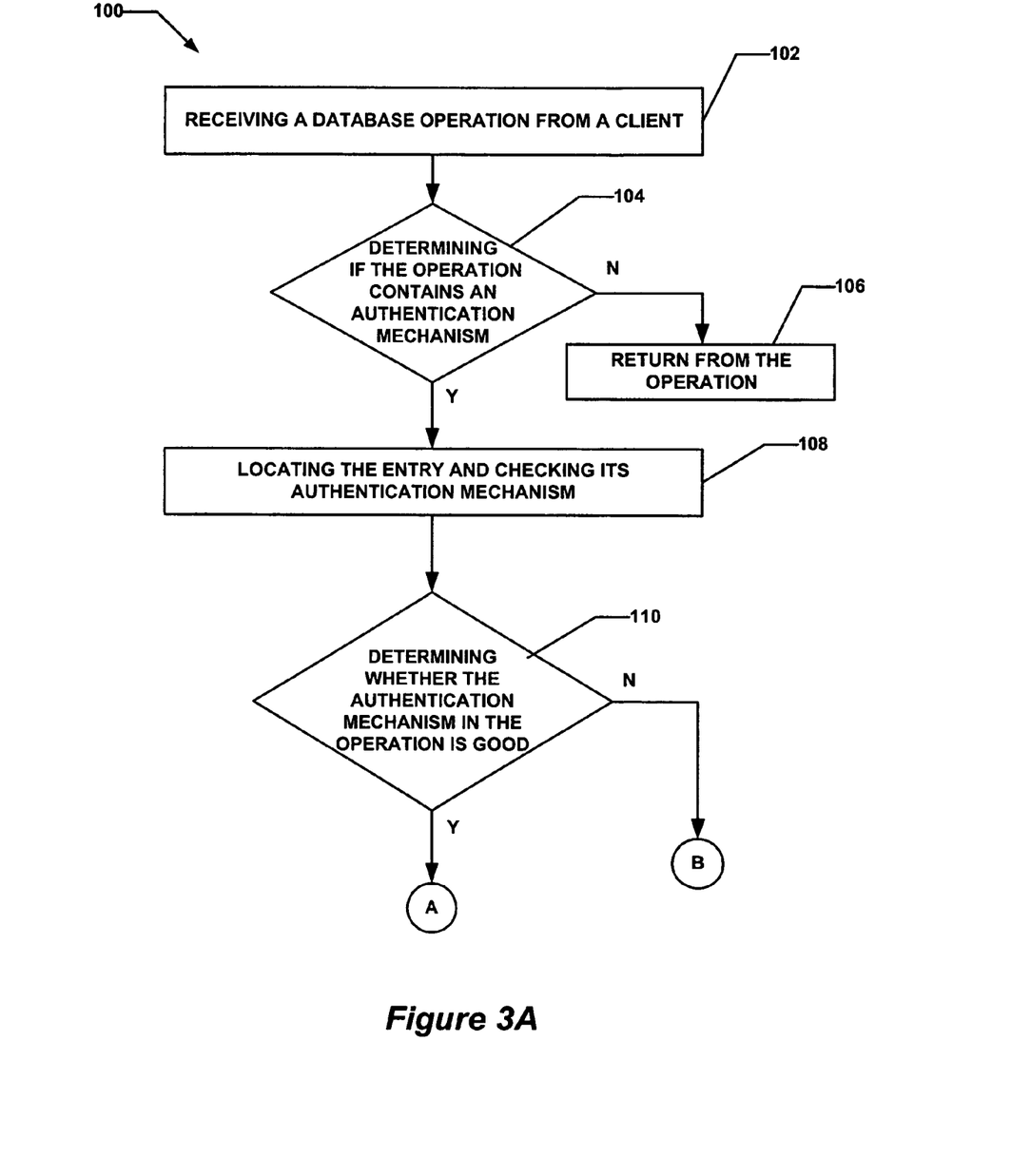
FIGS. 3A through 3C comprises a flow diagram of a particular embodiment of a method for providing GAL using OMS.
Figure 3B:
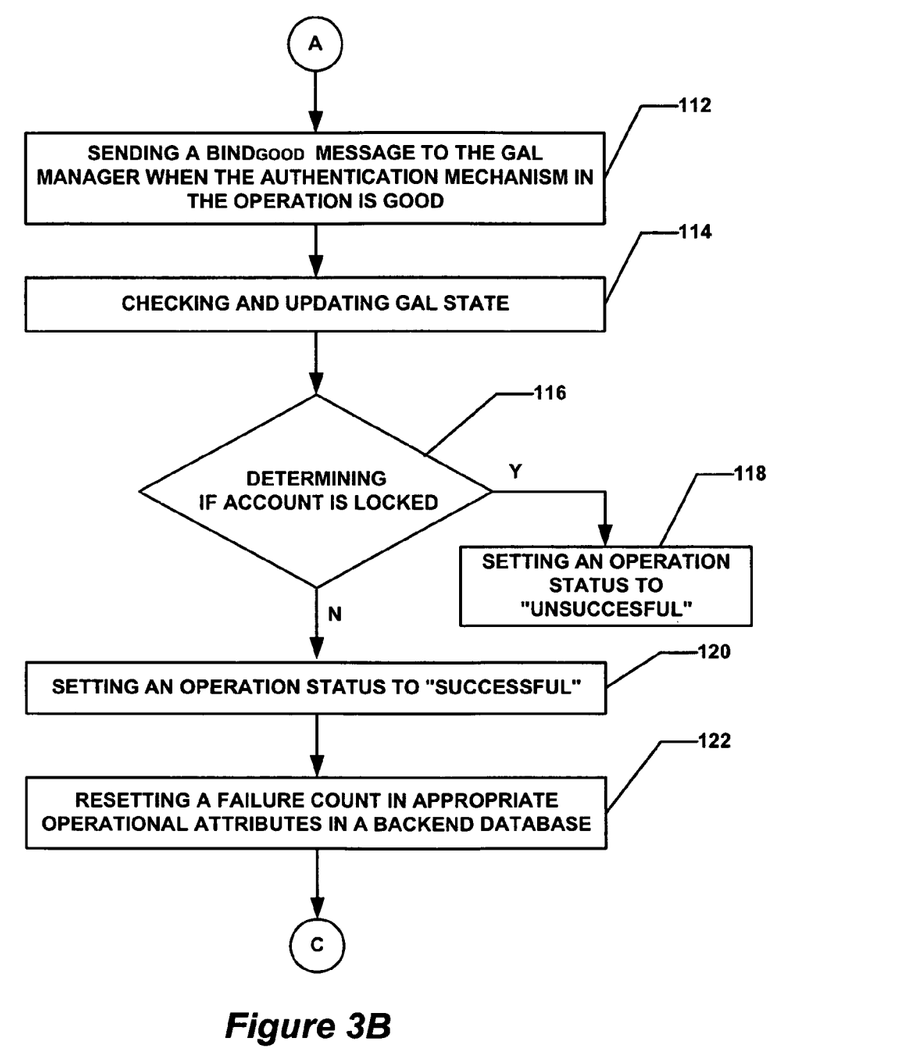
Figure 3C:
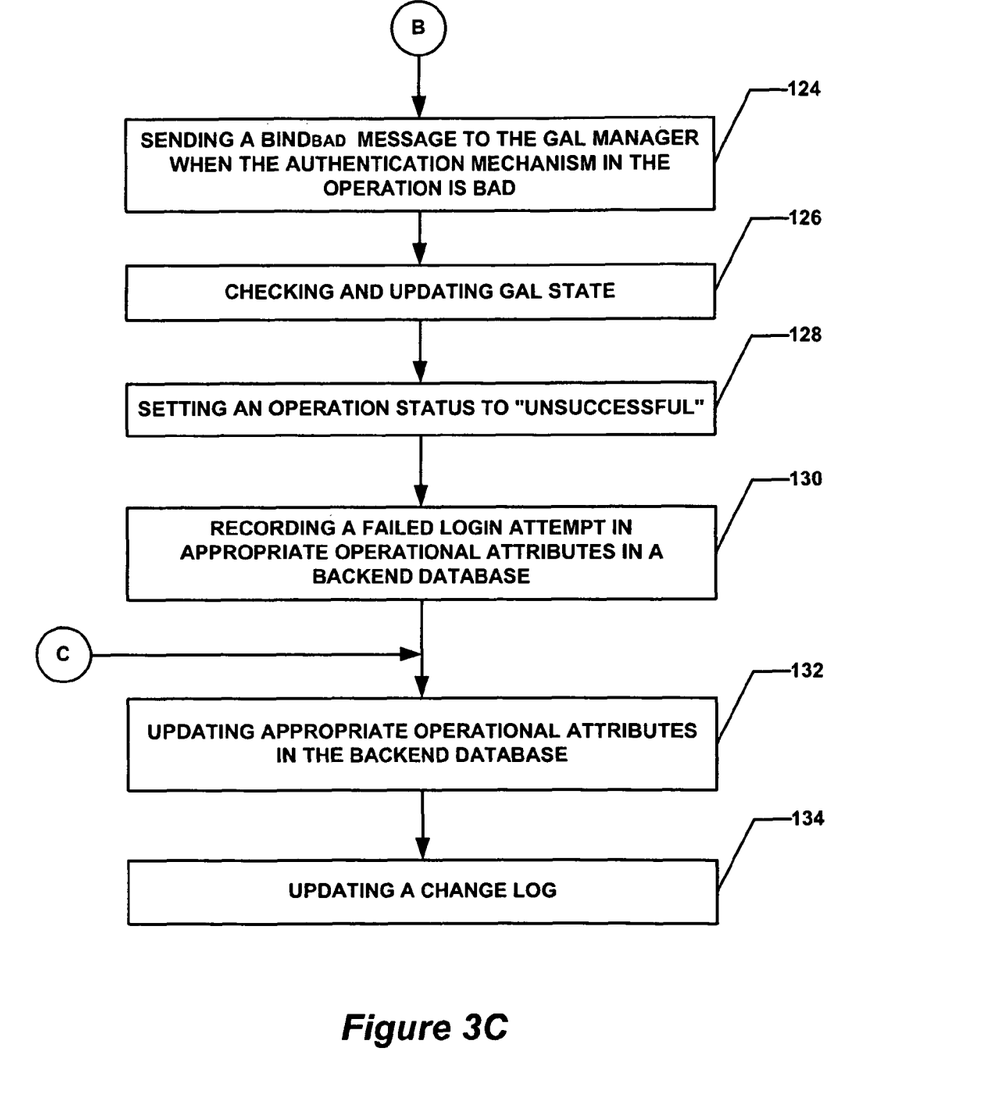

Referring now to FIGS. 3A through 3C, a method 100 of providing Global Account Lockout (GAL) using an Ordered Messaging Service (OMS) is shown. The method 100 begins with processing block 102 which discloses receiving a database operation from a client.

Decision block 104 recites determining if the operation contains an authentication mechanism. When the operation does not contain an authentication mechanism then processing continues with processing block 106, and when the operation does contain an authentication mechanism then processing continues with processing block 108.

When the operation does not contain an authentication mechanism, processing block 106 is executed. Processing block 106 recites returning from the operation.

When the operation does contain an authentication mechanism, processing block 108 is executed. Processing block 108 states locating the entry and checking its authentication mechanism. Next, decision block 110 is executed. Decision block 110 discloses determining whether the authentication mechanism in the operation is good. When the authentication mechanism is good, then processing continues with processing block 112. When the authentication mechanism is not good, then processing continues with processing block 124.

When the authentication mechanism is good, then processing continues with processing block 112, which discloses sending a bind$_{good}$ message to a GAL manager. Processing continues at processing block 114 which recites checking and updating GAL state.

Decision block 116 is performed next. Decision bock 116 states determining if account is locked. When the account is locked processing continues at processing block 118 which discloses setting an operation status to "unsuccessful".

When the determination at decision block 116 is that the account is not locked, then processing block 120 is executed. Processing block 120 recites setting an operation status to "successful". Processing block 122 recites resetting a failure count in appropriate operational attributes in a backend database. At this point processing continues with processing block 132, described later.

Referring back to decision block 110, when the authentication mechanism in the operation is not good, then processing continues at processing block 124 which discloses sending a bind message comprises sending a bind$_{bad}$ message to the GAL manager.

Processing continues at processing block 126 which recites checking and updating GAL state. This includes, as recited in processing block 128, setting an operation status to "unsuccessful" as well as recording a failed login attempt in the appropriate operational attributes in a backend database which is disclosed in processing block 130.

Processing continues at processing block 132 from either processing block 130 or from processing block 122. Processing block 132 recites updating appropriate operational attributes in the backend database. The process ends with processing block 134 which states updating the change log.

Figure 4A:
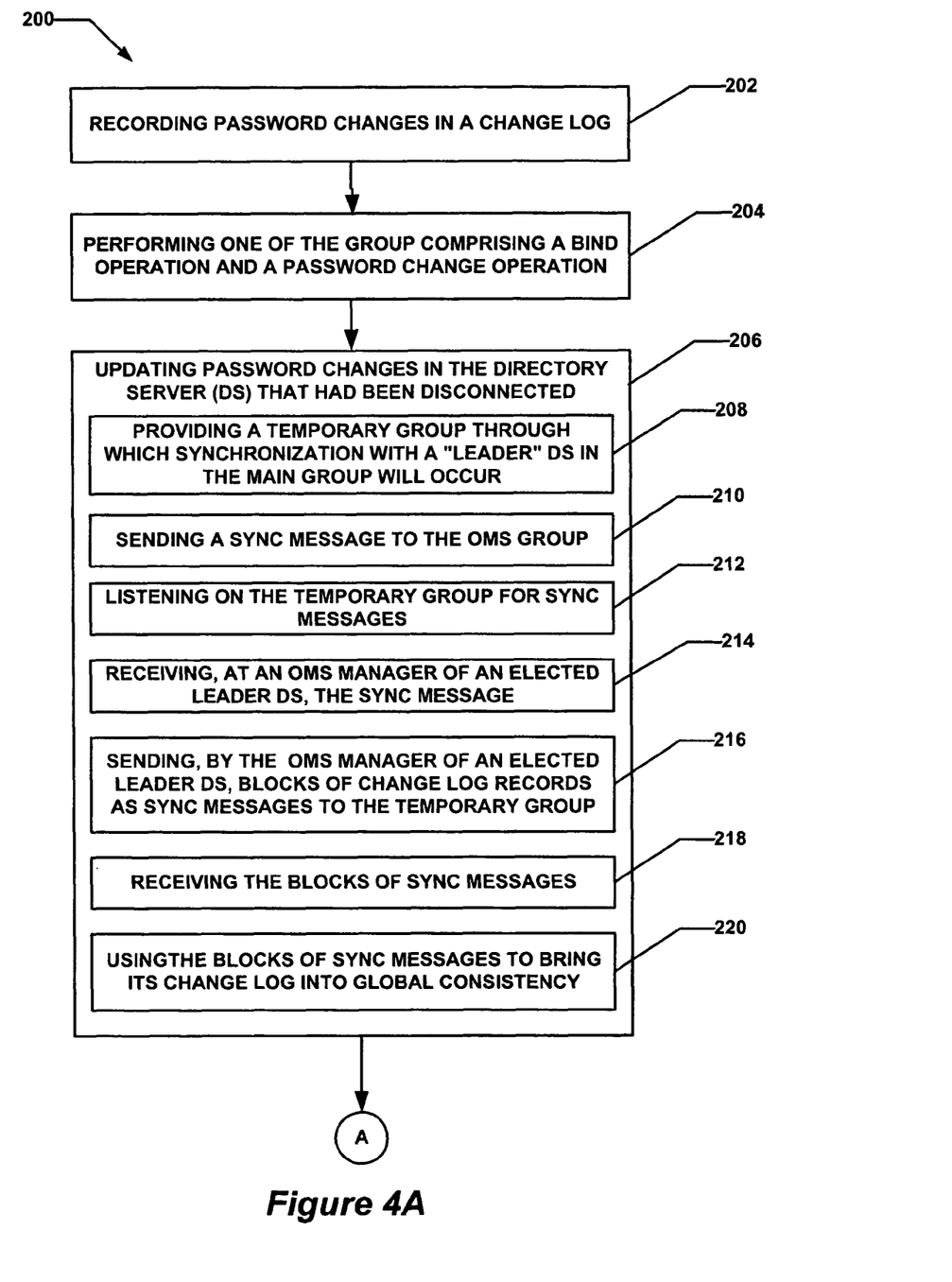
FIGS. 4A and 4B comprises a flow diagram of a particular embodiment of a method for providing synchronization in a system providing GAL using OMS.
Figure 4B:
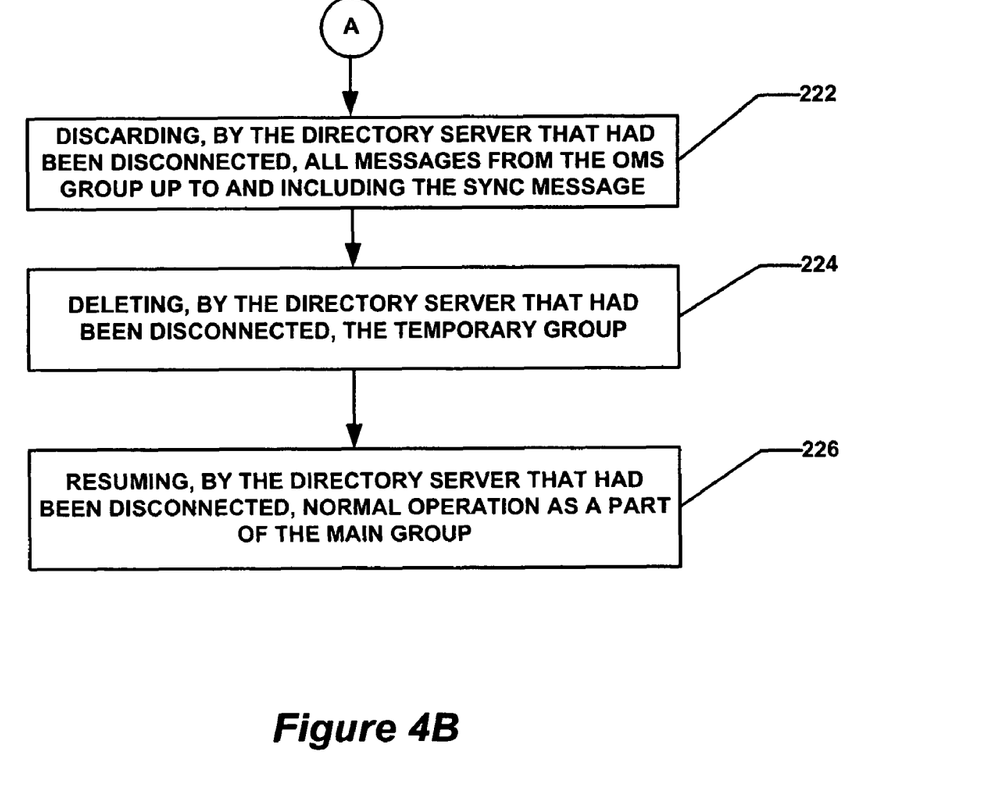

Referring now to FIGS. 4A and 4B, a particular embodiment of a method 200 of synchronizing directory servers performing Global Account Lockout (GAL) using an Ordered Messaging Service (OMS) is shown. The method begins with processing block 202 which discloses recording password changes in a change log.

Processing block 204 is then executed. Processing block 204 recites performing one of the group comprising a bind operation and a password change operation.

Processing continues with processing block 206 which states updating password changes in the Directory Server that had been disconnected. The process of updating password changes is shown in processing blocks 208 et seq. Processing block 208 discloses providing, by the OMS Manager in the DS that had been disconnected, a temporary group through which synchronization with a Leader DS in the main group will occur. Processing block 210 recites sending, by the OMS Manager in the DS that had been disconnected, a sync message to the OMS group. Processing block 212 states listening, by the OMS Manager in the DS that had been disconnected, on the temporary group for sync messages. Processing continues with processing block 214 which discloses receiving, at an OMS Manager of the elected Leader DS, the sync message and by processing block 216 which recites sending, by the OMS Manager of the elected Leader DS, blocks of change log records as sync messages to the temporary group. Processing block 218 states receiving, by the OMS Manager in the DS that had been disconnected, the blocks of sync messages and processing block 220 states using, in the DS that had been disconnected, the blocks of sync messages to bring its Change Log into global consistency.

Processing continues at processing block 222 which discloses discarding, by the DS that had been disconnected, all messages from the OMS group up to and including the sync message. Processing block 224 recites deleting, by the DS that had been disconnected, the temporary group. The process ends with processing block 226 which states resuming, by the DS that had been disconnected, normal operation as a part of the main group.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of synchronizing a plurality of directory servers provided in communication with each other in a group communication system, directory servers performing Global Account Lockout (GAL) using an Ordered Message Service (OMS) having OMS managers, the method compromising:

performing a bind operation;

performing a password change operation;

in a Directory Server (DS) that had been disconnected from the plurality of directory servers in the group communication system, updating a password changes in a change log of the DS that had been disconnected from the plurality of directory servers, wherein said instructions for updating comprises:

providing, by said OMS Manager of the DS that had been disconnected, a temporary group through which synchronization with a Leader DS in the main group will occur, sending, by said OMS Manager of the DS that had been disconnected, a sync message to the OMS group, listening, by the OMS Manager of the DS that had been disconnected, on the temporary group for sync messages, receiving, at an OMS Manager Leader DS, the sync message, sending, by an OMS Manager of the Leader DS, blocks of change log records as sync messages to the temporary group, receiving, by said OMS Manager of the DS that had been disconnected, the blocks of sync messages, using, in the DS that had been disconnected, said blocks of sync messages to bring into global consistency the change log of the DS that had been disconnected, and discarding, by the DS that had been disconnected, all messages from an OMS group up to and including the sync message.

2. The method of claim 1 further comprising deleting, by the DS that had been disconnected, the temporary group.

3. The method of claim 2 further comprising resuming, by the DS that had been disconnected, normal operation as a part of the plurality of directory servers.

4. A non-transitory storage medium having non-transitory computer readable instructions recorded thereon for synchronizing a plurality of directory servers provided in communication with each other in a group communication system, the directory servers performing Global Account Lockout (GAL) using an Ordered Message Service (OMS) having OMS managers, the computer readable instructions comprising instructions for:

performing a bind operation;

performing a password change operation;

updating password changes in a change log of a Directory Server (DS) that had been disconnected from the plurality of directory servers, wherein said instructions for updating comprise instruction for providing, by said OMS Manager of the DS that had been disconnected, a temporary group through which synchronization with a Leader DS in the main group will occur, sending, by said OMS Manager of the DS that had been disconnected, a sync message to the OMS group, listening, by the OMS Manager of the DS that had been disconnected, on the temporary group for sync messages, receiving, at an OMS Manager Leader DS, the sync message, sending, by an OMS Manager of the Leader DS, blocks of change log records as sync messages to the temporary group, receiving, by said OMS Manager of the DS that had been disconnected, the blocks of sync messages, using, in the DS that had been disconnected, said blocks of sync messages to bring into global consistency the change log of the DS that had been disconnected, and discarding, by the DS that had been disconnected, all messages from an OMS group up to and including the sync message.

5. The storage medium of claim 4 further comprising instructions for deleting, by the DS that had been disconnected, the temporary group.

6. The storage medium of claim 5 further comprising instructions for resuming, by the DS that had been disconnected, normal operation as a part of the plurality of directory servers.

* * * * *